Figure 1:
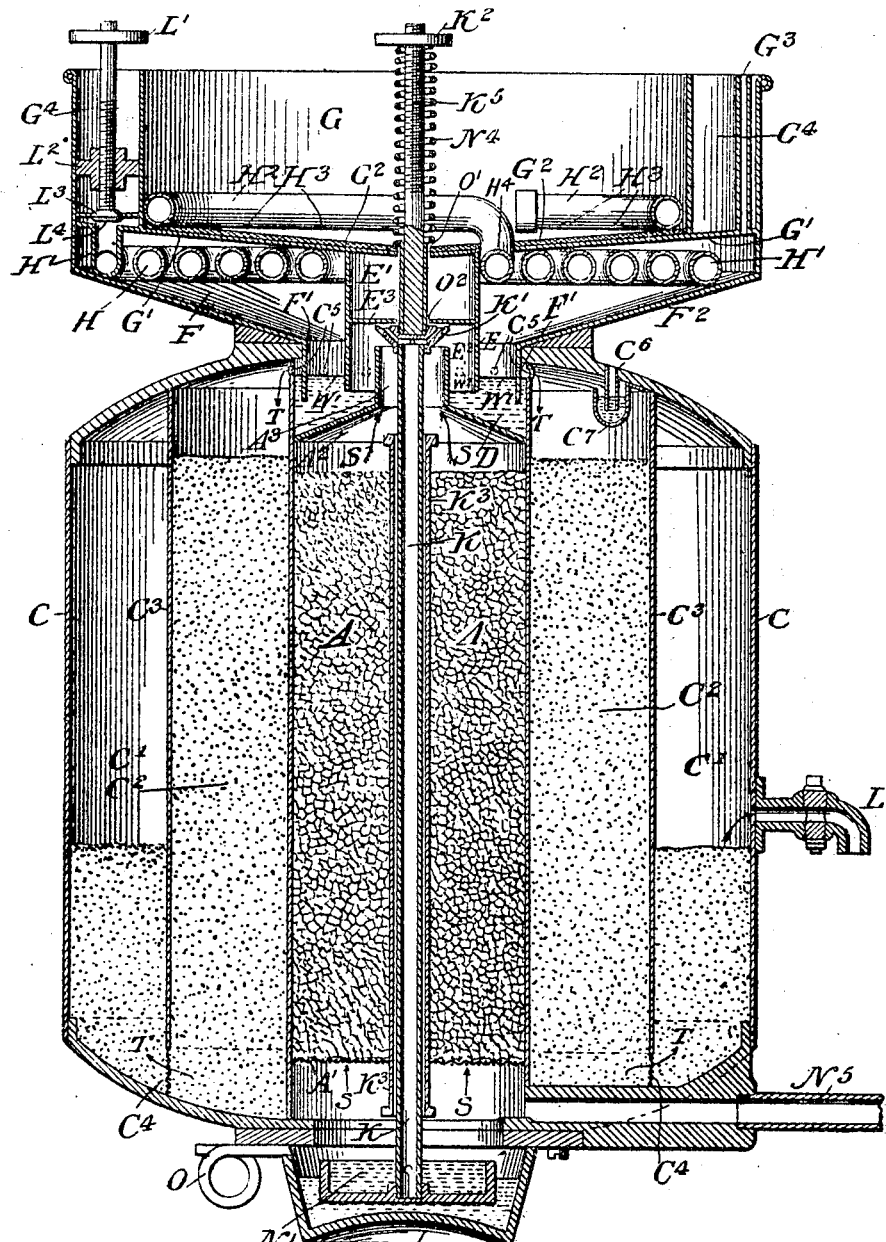

No. 798,901. PATENTED SEPT. 5, 1905.
H. F. HODGES.
APPARATUS FOR PURIFYING WATER.
APPLICATION FILED MAY 26, 1899.

3 SHEETS—SHEET 1.

Witnesses:
Edw. W. Vaill Jr.
Harry Cobb Kennedy.

Inventor:
Horace F. Hodges
By

No. 798,901. PATENTED SEPT. 5, 1905.
H. F. HODGES.
APPARATUS FOR PURIFYING WATER.
APPLICATION FILED MAY 26, 1899.
3 SHEETS—SHEET 3.
FIG. 3.
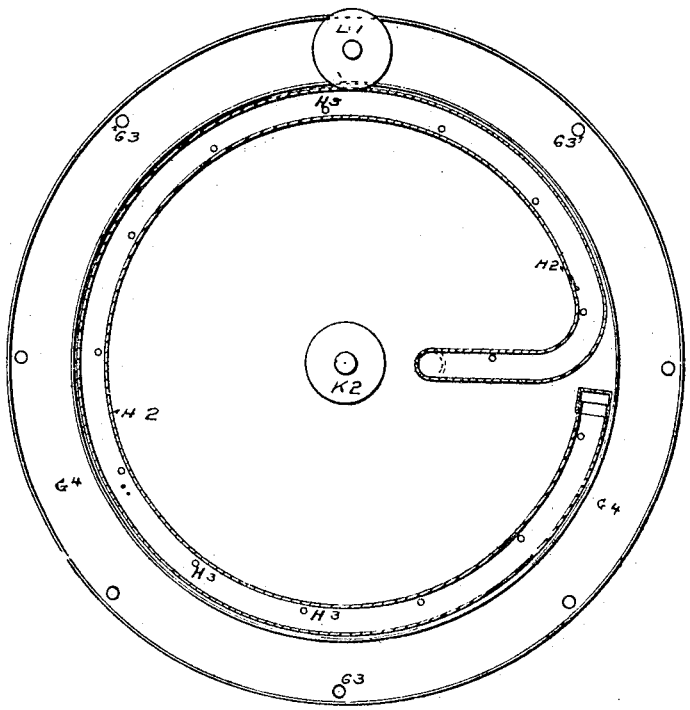
FIG. 4.
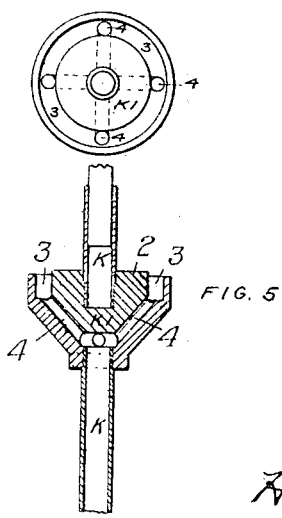
FIG. 5
Witnesses
R. R. Andrews
Horace Franklin Hodges
Inventor

UNITED STATES PATENT OFFICE.

HORACE FRANKLIN HODGES, OF PHILADELPHIA, PENNSYLVANIA, ASSIGNOR, BY MESNE ASSIGNMENTS, TO AMERICAN WATER PURIFYING COMPANY, A CORPORATION OF DELAWARE.

APPARATUS FOR PURIFYING WATER.

No. 798,901.     Specification of Letters Patent.     Patented Sept. 5, 1905.

Application filed May 26, 1899. Serial No. 718,390.

*To all whom it may concern:*

Be it known that I, HORACE FRANKLIN HODGES, a citizen of the United States, and a resident of Philadelphia, in the county of Philadelphia and State of Pennsylvania, have made certain new and useful Improvements in Apparatus for Purifying Water, of which the following is a specification.

My invention relates to an improved apparatus for the purification of water, and has for its primary object to provide means for removing from water any bacteria, gases, or other impurities which it may contain, whether of a solid or liquid nature, by the agency of heat.

During the course of my experiments I have found that if water is distilled by the ordinary way in a closed condenser it retains by absorption many ill-tasting and deleterious gases, which give to it that peculiar flat or bitter flavor which has justly rendered distilled water unpopular for table use. This taste has generally been supposed to be due to the absence of air and has been partially removed by aeration. I have found, however, that the oxygen of the air partially oxidizes these gases and renders them tasteless, thus making the water more palatable, but leaving in it the products of oxygenation as impurities.

My invention completely obviates these difficulties, as by my process the steam is so condensed that it cannot reabsorb these gases during the operation, and the product is entirely free from this objectionable feature, of a very agreeable flavor, and possesses properties and qualities differing materially from ordinary distilled water. I was led to this discovery by observing the bitter taste in the central portion of blocks of artificial ice made by the "can system," where large sums of money have been spent in supplying the finest grade of distilled water for freezing. Notwithstanding the great care taken the central part of such blocks is decidedly bitter and often of a putrid odor. The outer and crystalline part is perfectly sweet, while the bitter and malodorous portion is always central and opaque. I found that this taste arose not from the water, but from the contained gases concentrated at the center by the process of freezing, which also prevented regular crystallization. The usual attempt to cure this trouble is by boiling or agitating with steam the distillate; but, once absorbed, these gases cannot be removed by boiling except, perhaps, when in the form of a spray or drops, and thereafter the water must be kept protected from such gases or they will be immediately reabsorbed.

Figure 2:
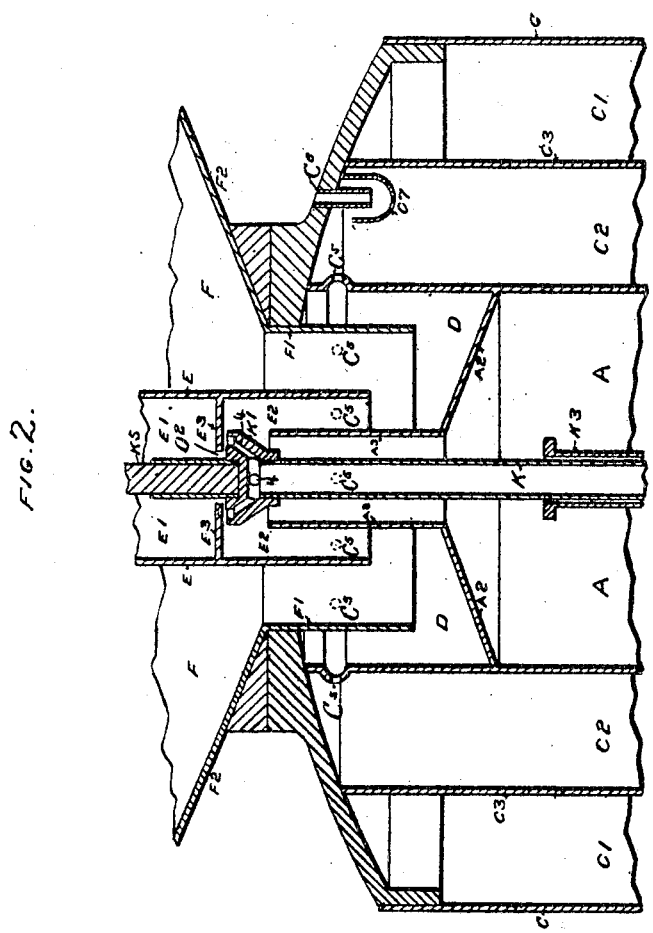

In the drawings accompanying this specification and forming a part thereof, Figure 1 is a vertical central section of a purifier constructed according to my invention. Fig. 2 is an enlarged vertical section of the upper central portions of Fig. 1. Fig. 3 is a plan view, partly in section. Fig. 4 is a plan view of a feed-valve used in maintaining automatically a constant supply of water in the steam-generator, the last being drawn from the overflow of the condensing water; and Fig. 5 is a vertical section of valve shown in Fig. 4.

Similar characters refer to similar parts in the various views.

Referring to Fig. 1, A is an internal chamber adapted to contain foundry-coke, the latter resting on the screen-bottom A'. It is closed at the top by the head $A^2$ except for the short vertical outlet-pipe $A^3$. C is a cylinder or jacket inclosing the lateral walls of chamber A, being closed at its upper and lower ends. It is divided into two concentric annular chambers C' $C^2$ by the vertical cylindrical partition $C^3$, which latter has its lower end $C^4$ perforated or formed of wire screen. This partition is removably secured in position. Both chambers C' $C^2$ are adapted to contain wood-charcoal, as shown. The inner walls of the chamber $C^2$ extend a little way above the top $A^2$ of chamber A, forming thereon and around pipe $A^3$ a receptacle or basin D, and this wall is pierced at its upper end by small holes $C^5$, whereby water collecting in said basin D may flow over into the inner compartment $C^2$ of chamber C when it reaches a certain level in said basin, thus maintaining a constant level therein. A pipe $A^3$ is slightly higher than this level for purpose described farther on. F is a broad and shallow chamber placed centrally over chamber A and forming an upward and lateral extension of basin D. Its bottom $F^2$ is inwardly inclined, terminating in the depending annular ring F', whose lower edge extends below the level maintained by the water in basin D and of the holes $C^5$, thus forming a trap to protect the latter from the passage of steam or gases through them. The top of the chamber F is formed by the bottom G' of the basin G, also inwardly inclined. At the center of chamber F and firmly attached to the bottom G' of the basin G is situated a small vertical cylinder E, having midway of its length a horizontal partition $E^3$, dividing it into two parts $E'$ $E^2$, the latter of which, $E^2$, forms an inverted cap or deflector over the pipe $A^3$, and its lower edge extends below the level of the water in basin D, thus forming a trap for steam entering it by means of the pipe $A^3$. Both bottom G' and partition $E^3$ have a small orifice at their centers, (O' $O^2$,) the latter, $O^2$, Fig. 2, being surrounded by a valve-seat on its under side. K is a tube extending from the bottom of the chamber A upward to the valve K', whence a rod $K^5$ continues upward through these orifices O' $O^2$, terminating in the upper part of basin G in a thumb nut and screw $K^2$. Situated on this tube and attached thereto immediately below the partition $E^3$ is the valve-disk K'. (More distinctly shown in Figs. 4 and 5.) Its central part K' is adapted to close the orifice $O^2$ in the partition $E^3$ when raised. Around its central part 2 is a groove or gutter 3, from which lead passages 4, connecting with the bore of tube K, so that any water escaping from the orifice in the partition $E^3$ is conducted to the bottom of chamber A by the tube K. This tube K is supported in guide-tube $K^3$, its bottom end being secured to the bottom of basin N'. The upper part E' of cylinder E receives any surplus water from the upper side of bottom G' by way of the annular passage O'. G is a basin divided into two parts by a vertical annular partition, thus forming an outer chamber $G^4$, which serves as a reservoir for condensing water, while the bottom G' of the inner portion of the chamber G serves as an evaporating-surface for heated condensing-water, the same being covered with fibrous material $G^2$ to increase such evaporation. Any suitable material—such as ordinary toweling or "grass-cloth," &c.—may be used for this purpose. $G^3$ represents small tubes forming outlets for the gases that collect in chamber F. L is a spigot opening from the outer portion of chamber C', by which the purified product is drawn off for use. $L^3$ $L^4$ represent a valve opened or closed by means of the handle L' and the stationary nut $L^2$ and adapted to regulate the flow of water to the coil H $H^2$. H is a coil of pipe extending from the valve $L^3$ of the reservoir $G^4$ at its outer circumference H' to a central upwardly-projecting part $H^4$, where it passes upward through the bottom G' and is attached to an annular perforated pipe $H^2$. $H^3$ represents perforations in the latter pointing downward and inward and so located that water exuding from them is deposited on the fibrous material $G^2$, saturating it with moisture, the amount of said saturation being determined by the valve $L^3$. N is a basin designed for a generator of steam for the apparatus above described, heat being applied to its lower side for that purpose. This generator does not require to be larger than in the proportion shown, especially when steam from an external source is received through the pipe $N^5$. A constant supply of water from basin G is maintained therein by means of the basin N', supported by the tube K, the threaded spindle $K^5$, the thumb-nut $K^2$, and the spring $N^4$. The tension of the spring $N^4$ is regulated by the thumb-nut $K^2$ acting on the threaded spindle $K^5$ and is such that when basin N' is surrounded by water it will raise the said basin, tube K, and its attachments, but not unless thus surrounded. Thus the vertical position of basin N' is regulated by the amount of water in basin N. $N^5$ indicates a steam-inlet pipe if it is desired to use steam from an outside source of supply or generator, as is often done in distilling apparatus.
The course of the steam in this apparatus is denoted by arrows marked S. W' represents the level of water in basin D outside of deflector $E^2$, and $W^2$ shows the level of water within said deflector depressed by the effort of the steam to escape therefrom. Arrows marked T show the course of the distillate after leaving basin D by way of the overflow-holes $C^5$. $C^6$ $C^7$ represent an air-trap for filtering through water any air passing into the chamber C as the surface of water therein is raised and lowered. It consists of a tube $C^6$, opening from the outer air into the bottom of a small metal cup $C^7$, the latter of which contains water. O is a loop of pipe opening from the water-level in generator N and having for its object the permitting of water to escape therefrom when it reaches that level, but not otherwise, while at the same time not allowing the steam in said generator to escape. The loop drops below the entrance from the generator to the same and then back to the original level, where it is open to the outer air. This loops fills with water, forming downward and upward columns which balance each other. Therefore water flowing in at one side escapes at the other; but steam to escape must depress the water in the entering side of the loop, for which the tension of the steam is not sufficient. I have found that the action of this automatic overflow is to effectually cleanse the generator from accumulating impurities resulting from the constant evaporation of water, the same passing off in solution or suspension.

As below stated, the water to be purified may be turned into steam in the generator N, or in some suitable outside generator. In either case the subsequent treatment of the steam is as follows: Being present in the bottom of chamber A, said steam passes upwardly through the screen-bottom A', enters the coke therein, passes upwardly through it, a small portion of it being condensed in such passage. The steam always contains gases formed at a high temperature at or about 212° Fahrenheit, and in this passage these gases are mostly either condensed and washed back by the slight amount of condensed steam formed or absorbed by it. The steam, continuing on upwardly through the pipe $A^3$ and meeting the deflector $E^2 E^3$ is turned downward, depressing the level of the water therein, (marked $W^2$,) where it escapes by boiling up through the level $W'$ of the water outside of it and rises into the chamber F. Here it comes in contact with the coil H and the roof $G'$. As the coil H contains water of a temperature lower than its own, heat flows from the steam to said water through the sides of said coil, causing a portion of said steam to assume the liquid state according to well-known laws. The remainder of the steam impinges against the surfaces $F^2$ and $G'$, the former of which conducts heat from it to the surrounding atmosphere, and the latter, by reason of the moistened fibrous material with which it is covered, absorbs some of its heat and evaporates some of the same into water-vapor, thereby utilizing its capacity for heat to the fullest extent. Thus losing its heat, the remaining steam condenses into the liquid state; but it will be observed that this condensation takes place at a temperature which is practically the boiling-point of the water and the distillate has no chance to cool much below it. Now in order to absorb gases to any extent this distillate must become cool, the rate at which absorption of gases takes place increasing rapidly as the temperature decreases. For this reason the cooler water is admitted at the outer upturned portion of the coil, (indicated by $H'$,) becomes hotter as the center is approached, and is finally deposited on the fibrous material $G^2$ at or near its boiling-point, whereby the steam reaches successively cooler and cooler surfaces as it spreads from its central entering-point, the gases by this means being forced to the outer edge of chamber F and finally passing up through the tubes $G^3$ into the outer air; but as soon as drops of distillate form they fall into the water in basin D through the ascending steam, effectively preventing any absorption of gases. As the distillate thus collects it is subject to a continual surface-boiling in basin D, while the level of the liquid is maintained by the lower portion passing up behind the ring $F'$ and out through the holes $C^5$ into chamber $C^2$. Thence the distillate passes downward through the charcoal therein contained, being kept hot by the steam ascending in the contiguous coke-chamber A till it passes into chamber $C'$ by the perforated lower part $C^4$ and upward through the cooler charcoal therein to the outlet-pipe L above which level it may be stored for use and drawn off as required. Condensing-water, which is the vehicle by which heat is removed from the steam, enters from the reservoir $G^4$ in a stream regulated by the valve $L'$ into the outer portion of coil H, becoming hotter as it flows to the center of said coil, and ascends by the connection $H^4$ through the roof $G'$ into the perforated coil $H^2$ and exudes by the perforations $H^3$ upon the moistened fibrous material $G^2$ on the centrally-inclined bottom $G'$ of basin G, moistening it freely. Here the larger part of it is evaporated by the heat from the steam in chamber F; but enough to feed the steam-generator N passes into the cup $E'$, thence through the valve $K'$ into the tube K, and thence into the basin $N'$, filling it and overflowing into basin N. As the level of the water rises in said basin N it surrounds basin $N'$, rendering it lighter by the weight of the water said basin displaces, enabling the spring $N^4$ to raise basin $N'$, and with it tube K and its valve $K'$, shutting off the flow of water from above. As the water in generator N is evaporated and the basin $N'$ falls in consequence water is again admitted in such quantity as to maintain a constant level in said generator N.

I am aware that distilling apparatus has been made with arrangements for boiling the distillate, for filtering the distillate through charcoal, and with vents to allow for the escape of gases; but all such mechanisms, to my knowledge, have been open to numerous defects, and none of them has employed all these devices simultaneously and at the proper temperature and stages. In none, to my knowledge, has the proper provision been to prevent the water from being chilled after condensation and before reboiling and seclusion, and I have found that gases once absorbed by reason of exposure to them when chilled cannot be expelled by subsequent reboiling. In none has the device of downward hot and upward cooler charcoal filtration been provided, features which are vital to success. The superimposed basin D and steam-pipe $A^3$ upon the coke-chamber A for the purpose of maintaining the proper temperature of the water during reboiling, and primary filtration are, in my belief, here employed for the first time. With regard to the position and arrangement of the basin or distillate-receptacle D, the depending ring $F'$, and the pendent cap $E^2$ of the cylinder E, I wish to state that these also are important. The cap $E^2$ of the cylinder dips down into and below the level of the distillate in basin D, making a submerged inlet which causes the steam to boil out under the edge of cylinder-section $E^2$ into the space between said cylinder-cap and the depending ring $F'$, which latter also extends some distance farther below the level of the distillate. This produces two results. In the first place, the surface of the distillate in the annular space between the surface of the distillate in the annular space between cap $E^2$ and the depending ring $F'$ is maintained very hot and in active agitation, which causes it to exercise a repellent action on the deleterious gases, so that they are not absorbed by the distillate, and this hot surface is always maintained because the outlets $C^5$ only take off the lower and cooler portion of the distillate below the level of the depending ring $F'$, the annular space outside of ring $F'$ forming a submerged outlet. The use of surface and vaporing condensers simultaneously is also, I believe, novel.

Various changes in the details of my apparatus may be made without departing from the spirit and scope of my invention. Hence I do not desire to be limited to the exact construction shown and described herein.

Having thus described my invention, what I claim as new, and desire to secure by Letters Patent, is—

1. In a water-purifying apparatus, the combination of a generating-chamber, a receptacle for the distillate located on the top of said generating-chamber, a condensing-chamber above said receptacle from which the distillate drains into said receptacle, cooling means for said condensing-chamber, said distillate-receptacle having a submerged inlet for the steam to be condensed and a submerged outlet for the distillate arranged as described to maintain the hot surface of the distillate by withdrawing only the lower and cooler layers of the same.

2. In a water-purifying apparatus, the combination of a steam-generator, a chamber having coke therein located above said generator, a condensing-chamber above said coke-chamber, and a chamber having charcoal therein surrounding said coke-chamber, there being a passage for the distillate between the condensing-chamber and the charcoal-chamber.

3. In a water-purifying apparatus, the combination of a condensing-chamber, a cooling-coil located in said chamber, and means for delivering the cooling-water from said cooling-coil to the outer surface of the wall of said condensing-chamber to provide surface evaporation.

4. In a water-purifying apparatus, the combination of a condensing-chamber, a cooling-coil in said chamber, absorbent material on the upper surface of the wall of said condensing-chamber, and a pipe connected with said cooling-coil for delivering water over said absorbent material to provide for surface evaporation.

5. In a water-purifying apparatus, a steam-generator, a coke-chamber through which the steam from the generator must pass, a pipe passing through the coke-chamber, a deflector arranged above the outlet of said chamber, a laterally-extending condensing-chamber surrounding said deflector, means for ventilating the condensing-chamber, a coil of pipe located in the condensing-chamber adapted to be filled with flowing water, an open chamber above the condensing-chamber, a coil of pipe located in said open chamber connected with the coil in the condensing-chamber, perforations in the said coil for the escape of water, a communication between said chamber and the generator and a double-celled charcoal-chamber surrounding the coke-chamber adapted to be heated by radiation therefrom substantially as described.

6. In a water-purifying apparatus, the combination of a steam-generator, a basin supported in said generator, a coke-chamber located above the generator, a pipe passing through said coke-chamber secured at its lower end to the basin, a deflector arranged above the outlet of said chamber, a condensing-chamber surrounding said deflector, a valve-seat provided at the top of the centrally-disposed pipe, and a tension-spring connected to said valve-seat, whereby said spring and the height of water in the generator raises the basin contained therein and thus controls the admission of water automatically, substantially as described.

7. In a water-purifying apparatus, the combination of a chamber A, adapted to receive coke, a double charcoal-chamber $C'$, $C^2$, surrounding the coke-chamber, a condensing-chamber F, above the coke-chamber, means for ventilating said condensing-chamber, a reservoir $G^4$, above the condensing-chamber, an open chamber G, adjacent to the reservoir, a coil, H, in the condenser connected with the reservoir, a coil $H^2$, in the chamber G, communicating with the coil H, a centrally-disposed pipe K, connecting with the steam-generator, a communication between said pipe and the chamber G, and an automatic valve mechanism for controlling the feed of the water in the chamber G, to the generator, substantially as described.

8. In a water-purifying apparatus, the combination of a steam-generator, a coke-chamber located above the same, a condensing-chamber located above the coke-chamber, a water-chamber above the condenser, a feed-pipe connecting the said water-chamber with the generator, means for regulating the supply of water from the water-chamber to the generator, and a receptacle for the distillate between said condensing-chamber and said coke-chamber and having a submerged inlet for the steam and a submerged outlet for the distillate.

9. In a water-purifying apparatus, the combination of a steam-generator, a coke-chamber A, located above the same through which the steam from the generator must pass, a condensing-chamber located above the coke-chamber, a charcoal-chamber surrounding the coke-chamber and having communication with the condenser, a water-chamber above the condenser, a feed-pipe connecting the water-chamber with the generator and an automatic valve mechanism located in said feed-pipe adapted to open and close said pipe by the rise and fall of the water in the generator, substantially as described.

10. In a water-purifying apparatus, the combination of a coke-chamber A, a steam-generator below the coke-chamber adapted to supply it with steam, a condenser located above the coke-chamber and a drain-pipe K, passing downwardly through said chamber to the generator, substantially as described.

11. In water-purifying apparatus, the combination of the coke-chamber A, a steam-generator N, a condenser above the coke-chamber, an open evaporator above the condenser, a water-drain pipe K, extending from the evaporator into the generator, and mechanism for automatically regulating the admission of water from the drain-pipe to the generator whereby a constant level of water is maintained therein, substantially as described.

12. In a water-purifying apparatus, the combination of the coke-chamber A, a condensing-chamber above the coke-chamber, a basin located between the coke-chamber and the condenser adapted to collect the water condensing in the condenser, a steam-passage $A^3$, passing upwardly through said basin, a deflector above the steam-passage for directing the steam through the distillate in said basin to reach the condenser, apertures formed in the side walls of the basin and a depending ring F', extending in the basin below the apertures for forming a trap to prevent the escape of steam and maintain a constant water-level in the basin, substantially as described.

13. The combination with the coke-chamber, of a generator located thereunder, a condensing-chamber located above the coke-chamber, a basin D, between the condenser and the coke-chamber, a steam-passage passing through said chamber, a deflector arranged above the steam-passage for directing the steam through the accumulated distillate in the basin D, a coil of pipe arranged in the condenser, means for supplying water to said coil, and ventilating-tubes connecting the condenser with the atmosphere, substantially as described.

14. The combination with the condenser, F, comprising a shallow chamber provided with a covered top, of an annular water-chamber located above the condenser, a pipe-coil H, arranged in the condenser, a coil $H^2$, connecting with the coil H, located above the roof of the condenser, perforations provided in said coil and a covering of fibrous material provided on the top of said condenser for the purpose described.

15. The combination with the coke-chamber; of a generator located thereunder, a steam-passage provided in the top of the coke-chamber, a deflector arranged above said steam-passage, a water-chamber above the deflector, a condensing-chamber surrounding the deflector and water-chamber, a pipe-coil arranged in the condenser and adapted to receive the raw water, an open chamber above the condenser, a coil of pipe arranged in said chamber in communication with the condenser-coil, a drain-pipe connecting the water-chambers with the generator and an automatically-controlled valve for regulating the admission of water to the generator, substantially as described.

16. The combination with a main steam-generator, of a coke-chamber arranged above the same, a steam-passage in the top of said coke-chamber, a condensing-chamber above the coke-chamber, a pipe-coil in the condensing-chamber for receiving the raw water, an open-top chamber arranged above the condenser, a sprinkling-coil located in said chamber having connection with the coil in the condenser and means for conveying the water from the open chamber to the generator.

17. The combination with a steam-generator; of a coke-chamber arranged above the same through which the steam must pass, a steam-passage in the top of the coke-chamber, a condensing-chamber into which the steam-passage leads, means for ventilating the condensing-chamber, a coil-pipe in the condensing-chamber adapted to receive raw water, a chamber located above the condenser open to the atmosphere, a covering of fibrous material provided on the bottom of said open chamber, a sprinkling-coil arranged in said open chamber in connection with the coil of the condenser and a drain-pipe leading from said open chamber to the generator, substantially as described.

18. The combination of a coke-chamber, a steam-chamber arranged below the coke-chamber, a condensing-chamber above the coke-chamber, a series of spirally-arranged coils in said condenser, means for feeding the water to the outer coil, ventilating-tubes located near the side walls of the condenser, an open chamber arranged above the condensing-chamber, a perforated coil in the bottom of the open chamber extending from the inner coil in the condenser for delivering heated water on the bottom of the open chamber, a covering of fibrous material provided on the bottom of said chamber adapted to be saturated with the water from the perforated coil and a communicating pipe between said open chamber and the steam-generator.

19. In a water-purifying apparatus, a shallow laterally-extended condenser, F, a steam-entrance provided in the bottom of said condenser, a coil H, arranged spirally in the condenser adapted to receive water from its outer coil which will circulate to the inner coil and thus become heated, ventilating-tubes $G^3$, located adjacent the side walls of the condenser, an aerating-chamber arranged above the condensing-chamber, a pipe extending from the inner spiral of the coil in the condenser and terminating in an annular coil located in the bottom of the aerating-chamber, perforations provided in said annular coil, a drain-pipe connecting the aerating-chamber with the generator, and means for automatically regulating the feed of water from the aerating-chamber to the generator, substantially as described.

20. The combination of a centrally-disposed coke-chamber, a steam-generator located below said coke-chamber, a condenser above the coke-chamber, an annular chamber $C^2$, surrounding the coke-chamber having communicating ports with the condenser, an outer chamber $C'$, surrounding the chamber, $C^2$, a communication at the bottom of the chamber $C^2$, with the chamber $C'$, and means for withdrawing the distillate from the chamber $C'$.

21. The combination, of a steam-generator, a coke-chamber above the same, a condensing-chamber above the coke-chamber, a water-chamber above the condenser, a vertically-disposed pipe extending from the generator through the water-chamber, a yielding support for said pipe, a valve in said pipe communicating with the water-chamber, and means for raising said pipe automatically, for the purpose described.

22. The combination with the coke-chamber adapted to receive steam, a steam-outlet in the top of said chamber, a deflector provided over said outlet, a condensing-chamber above the coke-chamber, a basin D, provided in the bottom of the condenser, passage-ways formed in the wall of said basin, a depending flange extending in front of the said passage-way to form a trap and a purifying-chamber surrounding the coke-chamber, substantially as described.

In testimony whereof I have signed my name to this specification, in the presence of two subscribing witnesses, on this 18th day of May, A. D. 1899.

HORACE FRANKLIN HODGES.

Witnesses:
   Jos. KUEN,
   R. R. ANDREWS.